Oct. 13, 1942.  G. L. KOTHNY  2,298,706
METHOD AND APPARATUS FOR ORIENTING TOOLS
Filed Nov. 18, 1940  3 Sheets-Sheet 1

WITNESS:  INVENTOR
Rbt C Kitchel.  Gottdank L. Kothny
BY Busser + Harding
ATTORNEYS.

Oct. 13, 1942.   G. L. KOTHNY   2,298,706
METHOD AND APPARATUS FOR ORIENTING TOOLS
Filed Nov. 18, 1940   3 Sheets-Sheet 2

WITNESS:
Rob R Mitchel.

INVENTOR
Gottdank L. Kothny
BY
Busser + Harding
ATTORNEYS.

Oct. 13, 1942.  G. L. KOTHNY  2,298,706
METHOD AND APPARATUS FOR ORIENTING TOOLS
Filed Nov. 18, 1940   3 Sheets-Sheet 3

INVENTOR
Gottdank L. Kothny
BY
Busser + Harding
ATTORNEYS.

Patented Oct. 13, 1942

2,298,706

UNITED STATES PATENT OFFICE 2,298,706

METHOD AND APPARATUS FOR ORIENTING TOOLS

Gottdank L. Kothny, Strafford, Pa., assignor to Sperry-Sun Well Surveying Company, Philadelphia, Pa., a corporation of Delaware Application November 18, 1940, Serial No. 366,113

14 Claims. (Cl. 255—1)

This invention relates to a method and apparatus for orienting tools in a bore hole and in particular to means adapted both for effecting orientation and for the removal of a tool from the hole.

In my application Serial No. 355,881, filed September 9, 1940, there is described a method and apparatus for orienting tools in a bore hole involving a moderately prolonged rotation of a whipstock or similar tool while it is attached to a drill stem and before it is set in the hole by release from the drill stem. Usually a whipstock is carried by a drill stem by means of a shear pin which is sheared by the application of the weight of the drill stem to the pin when the whipstock is located in a final position. This shear pin is by its nature necessarily not of extreme strength, and rotation of the type referred to is not unlikely to result in shearing of the pin before seating is to take place. In fact, even if prolonged rotation is not performed as described in my said application, but there are involved only small rotary movements for the purpose of properly orienting a whipstock, there is still some danger of shearing, and it is an object of the present invention to provide a stronger connecting arrangement to insure against danger of accidental release of the tool from the drill stem.

In my prior Patent 2,107,420, dated February 8, 1938, there is described a type of retrieving apparatus whereby a whipstock may be withdrawn from a hole whenever desired either upon an original withdrawal of a drilling bit or upon any subsequent withdrawal of such bit. A further object of the present invention is to provide an arrangement utilizing such retrieving apparatus for the purpose of rotating the tool without danger of its release.

Still another object of the invention relates to the provision of means for retrieving a go-devil with a well surveying instrument and the provision of a novel method involving such operation.

A further object of the invention is the provision of means for control of tool engaging elements including the provision of an arrangement for causing such elements to be automatically cocked.

As will be evident hereafter, the invention has as its further objects the provision of methods for the orientation of tools such as whipstocks involving various manipulations of elements in a hole.

These and other objects of the invention, particularly relating to details, will be apparent from the following description, read in conjunction with the accompanying drawings, in which:

Figures 1A, 1B, and 1C constitute three parts of a sectional view illustrating in order from top to bottom various elements carried by and associated with a drill stem in accordance with the invention;

Figures 1A, 1B, 1C:
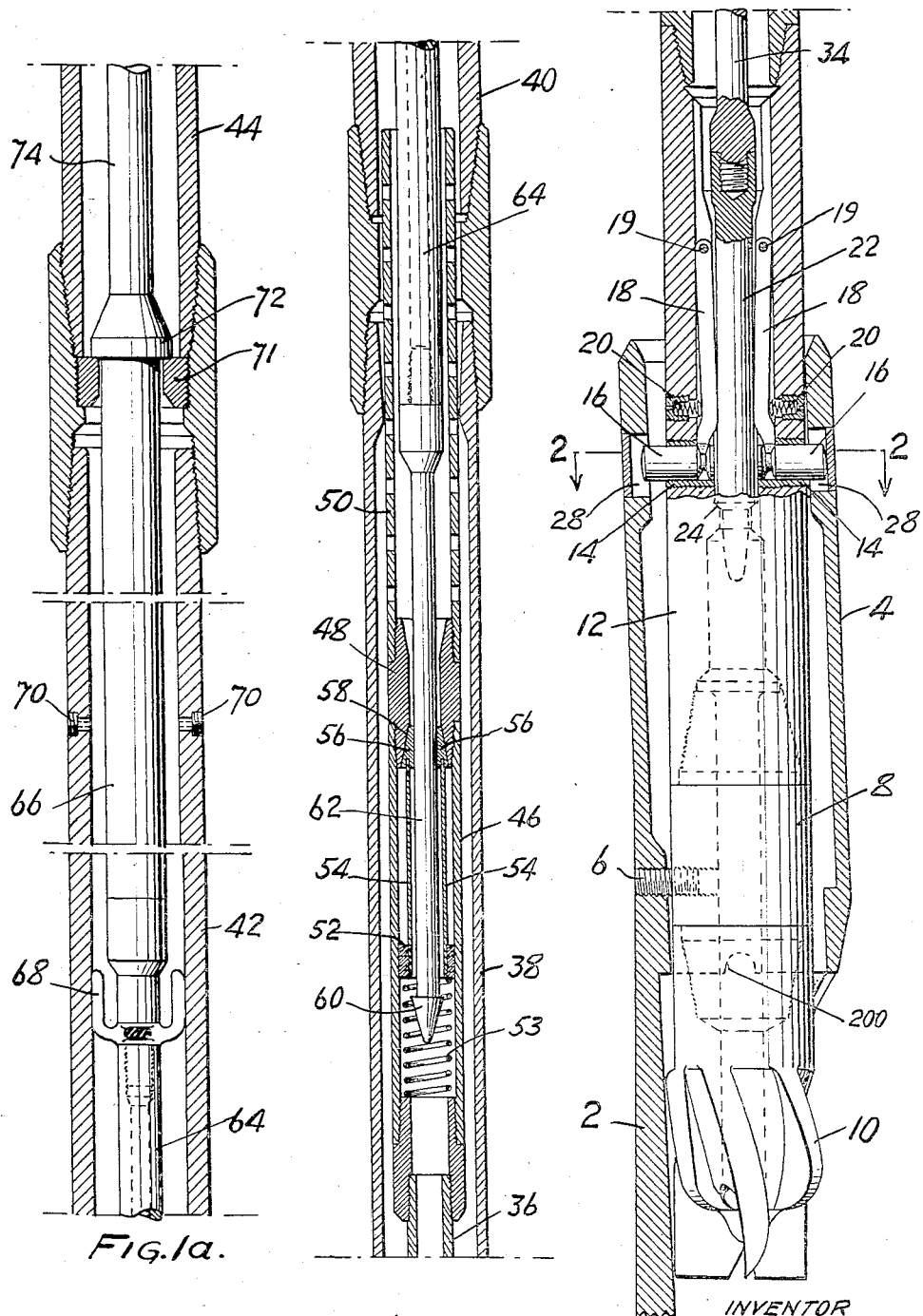
Figure 2:
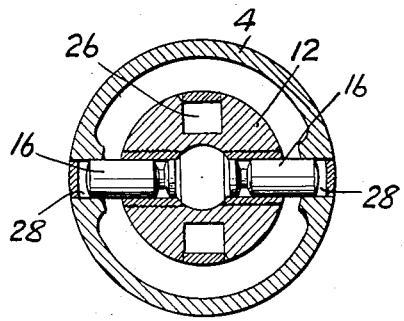
Figure 2 is a transverse section taken on the plane indicated at 2—2 in Figure 1.
Figure 3:
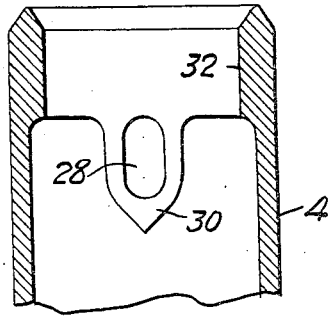
Figure 3 is a fragmentary section showing a construction involved in the upper portion of a whipstock collar.
Figure 4:
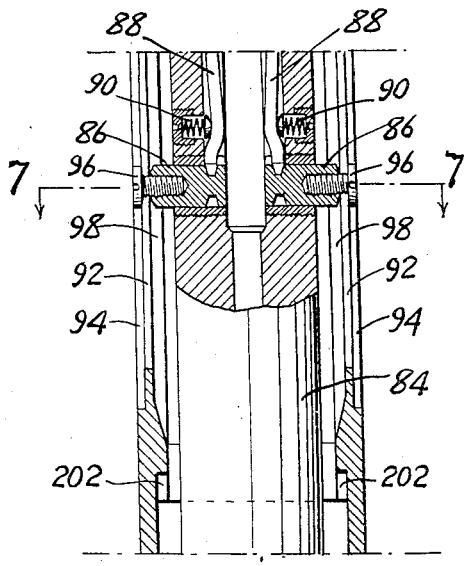
Figure 4 is a vertical section taken through a modified form of the invention.
Figure 5:
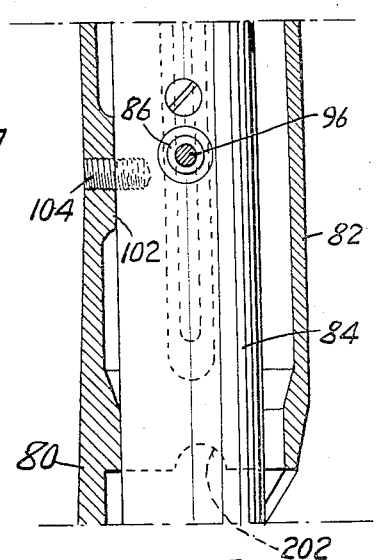
Figure 5 is a similar section taken at right angles to the section of Figure 4.

Referring first to the modification of Figures 1, 2 and 3, there is illustrated at 2, as representative of a tool to be oriented, a whipstock of conventional type provided at its upper end with a collar 4 to which is secured, by means of a shear pin 6, a collar 8 carrying a bit 10. Threaded to the collar 8 is a sub 12 forming the lowermost section of a supporting drill stem, of which various other sections will be referred to hereafter. The arrangement is such that the sub, drill stem and bit may pass freely through the whipstock collar both upwardly and downwardly after the connecting elements are disconnected.

The sub 12 differs structurally from the disclosure of my Patent No. 2,107,420, described above, but functions in its retrieving operations substantially similarly. It comprises laterally extending bores provided with bushings 14 in which are arranged for sliding movements bolts 16, grooved to receive the lower ends of levers 18, pivoted at 19 and pressed inwardly by spring arrangements indicated at 20. As the apparatus is originally assembled, inward movements of the levers 16 are prevented by the presence of a go-devil 22 located in the central bore of the sub and then resting on a seat 24.

The bolts 16 project into vertically elongated openings 28 formed in bosses 30, which extend downwardly as continuations of an inwardly projecting flange 32 at the upper end of the whipstock collar. The lower ends of the extensions 30 are pointed to serve, as will be described hereafter, to deflect the bolts 16 in a retrieving operation. The openings 28 have a horizontal dimension providing a snug fit for the bolts 16, so that, through the cooperation of these bolts and openings, rotational forces may be imparted to the whipstock to relieve the shear pin 6 thereof.

The go-devil 22 is extended upwardly by one or more rods 34 and tubes 36 to the extent desired, and through them and coupling connections is secured to the lower end of a tube 46 located in a drill stem section 38, between which and the lowermost section 44 of the drill stem proper is located an orientation sub 42. The tube 46 is connected by means of a coupling 48 to an extension tube 50, which is perforated to provide for mud circulation. Longitudinal extensions of these assemblies are primarily to bring the parts in desired position and to insure their remaining substantially central, as well as to give them sufficient weight to sink through heavy muds. It will be obvious that the particular extension arrangements used are subject entirely to convenience.

Within the tube 46 is a sliding ring 52 to which are secured, by means of rivets or other connection a pair of springs 54, the upper ends of which are formed, as indicated at 56, as exteriorly tapered dogs designed to be received within a tapered opening 58 in the connection 48. A spring 53 normally urges the ring 52 and the dogs 56 upwardly.

A spearhead 60 is carried by a rod 62, which in turn is carried by the extension rod or rods 64, secured to the lower end of the protective casing of a well surveying instrument 66, the central position of which is desirably maintained by means of star-shaped rubber guides, indicated at 68. The upper end of the protective casing of the surveying instrument is provided with an enlarged head 72, adapted to be supported upon a landing ring 71 located in a joint of the drill stem. Above the head 72 may be extension rods 74, which are in turn connected to a wire line for the raising and lowering of the surveying instrument.

The sub 42 is preferably of non-magnetic material and carries magnets 70 for orientation purposes by the use of the method described in the patent to Hyer 2,120,670. The arrangement is such that when the surveying instrument is in its seated position, illustrated, a compass is located adjacent the magnets 70 so as to be responsive to them while, in the upper portion of the instrument, there is another compass responsive to the magnetic field of the earth. By recording the positions of these compasses, and by a knowledge of the azimuthal relationships of the portions of the drill stem assembly below the sub 42, the position of the whipstock or other tool may be ascertained as described in the Hyer patent. In case an inclination indicating means is used instead of a compass for determining the azimuth in making the orientation record, the sub 42 need not be of non-magnetic material. The details of orientation are described in said Hyer patent and need not be described further herein.

The modification so far discussed is designed primarily for use in the fashion now to be described, though it will be understood that the method of use may be varied as circumstances or the desires of the operator may dictate, i. e., all of the steps involved in the preferred method need not be used at all times.

The whipstock bit and the other parts are originally assembled as illustrated in Figure 1, with the exception that the surveying instrument and the associated spearhead are not lowered with the other parts. In this initial assembly, the bolts 16 are forced outwardly by reason of the presence of the go-devil 22 into the openings 28 closely engaging the side walls of these openings but being in an intermediate position in them from a vertical standpoint. The shear pin 6 connects the whipstock to the collar 8, as illustrated. This assembly is then lowered in the hole, and during or after the lowering, rotation and mud circulation may be provided to prevent caving in of the hole. The mud in this case bypasses the go-devil 22 through the passages 26 (Figure 2).

After the whipstock is brought approximately to the level at which it is to be set, the surveying instrument may be run down the interior of the drill stem on its supporting wire line without, however, having the spearhead attached thereto. When the instrument reaches its seated position on the landing ring 71, the rotation and mud circulation are stopped for a sufficient period to enable the instrument record to be made, and at this time the position of the drill stem at the surface is noted in accordance with the method of orientation described in my application Serial No. 355,881, referred to above. After the record is made, the instrument is withdrawn. During such withdrawal, the rotation may be resumed, as well as mud circulation and spudding, if the supporting wire line passes through a suitable stuffing box. During all the rotating operations heretofore described, the rotational forces will be applied to the whipstock through the medium of the bolts 16, thereby relieving the shear pin 6 of stress.

After the record has been developed and examined to ascertain the orientation which existed at the time the record was made, the surveying instrument may be reloaded and again run into the drill stem while rotation and/or spudding are continued. In this second case, however, the spearhead is attached to the surveying instrument.

As the instrument then approaches its final position, the spearhead will enter the coupling 48 and engage the dogs 56, forcing them downwardly against the action of spring 53 and spreading them apart as they leave the tapered socket 58. As soon as they are sufficiently spread, the spearhead will pass downwardly between the dogs, which are then immediately moved upwardly into the socket 58 by the spring 53, then desirably closely engaging the spearhead rod 62. Finally, when the surveying instrument reaches its seated position, the spearhead will occupy the position indicated in the central portion of Figure 1.

The rotation and spudding of the drill stem are now stopped and the stem is turned (as described in my application Serial No. 355,881) to the desired position as ascertained from the first record, and the drill stem held stationary during the making of the record by the surveying instrument. The surveying instrument is then pulled upwardly, and in this case the spearhead will engage the undersides of the dogs, lifting the go-devil assembly with it. As the go-devil moves from between the levers 18, the springs 20 will withdraw the pins 16 from the openings 28. The drill stem is not rotated after the making of this checking record.

In view of the original orientation, it is most likely that the checking record made by the surveying instrument will indicate that the whipstock is in proper final position. In such case, weight is applied to shear the pin 6, and drilling may then be started down the face of the whipstock to deflect the hole. However, if the check reading made by the surveying instrument indicates that the whipstock is not in desired position, it is only necessary to drop the go-devil to force the bolts 16 outwardly again into the openings 28 with which they will have been maintained in alignment by reason of the shear pin 6. It is for this reason that it is desirable to avoid shearing the pin 6 prior to this time even though the whipstock remains engaged by bolts 16, since if it is sheared, the bolts 16 may be accidentally displaced out of alignment with the openings 28. After the bolts 16 are thus reengaged in the openings, the whipstock may be again turned to correct its position. A check of the orientation in the above mentioned fashion may then again be made. By withdrawing the go-devil with the instrument, considerable time is saved, since but one lowering and recovering operation is necessary.

After the drilling has been carried out to a proper extent, the drill stem may be withdrawn, and in the first withdrawal or some subsequent withdrawal, the whipstock may be retrieved by dropping the go-devil 22 to force the pins 16 outwardly. In this case, the pins are desirably located below the whipstock collar 4, and in such case, when lifting takes place, they will engage the lower end of the collar, preferably, by subsequent rotation, being caused to engage notches 200 therein. If, however, the pins are located within the collar when forced outwardly, they will engage the flange 32, being deflected by the pointed lower ends of the extensions 30 in the event that they rise initially to engage these extensions.

Figure 6:
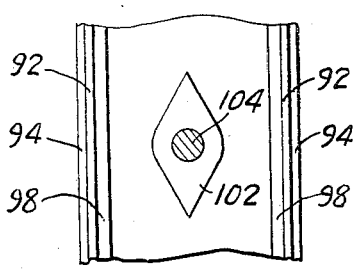
Figure 6 is a fragmentary longitudinal section showing a construction at the interior of a whipstock collar.
Figure 7:
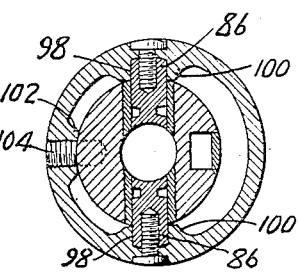
Figure 7 is a transverse section taken on the plane indicated at 7—7 in Figure 4.

In the modification of Figures 4, 5, 6 and 7, a similar retrieving subarrangement is disclosed, but in this case it is not necessary to provide for the lowering of the go-devil originally with the sub. In these figures a whipstock is indicated at 80 as provided with a collar 82. The sub extending through the whipstock collar is indicated at 84 and is provided with bolts 86, as in the previous modification, grooved to receive the lower ends of pivoted levers 88 and urged inwardly by springs 90. In this modification, the whipstock collar is provided with slots 92 provided with aligned exterior grooves 94 and interior grooves 98, the latter of which closely fit the bolts 86. In this modification, the bolts 86 are held outwardly by screws 96, which extend through slots 92 and have their heads sunk into the outer grooves 94. These bolts 96 may be of relatively weak and soft material such as brass, since their sole function is to hold the bolts 86 outwardly within the grooves 98 against the forces of the springs 90. As illustrated particularly in Figure 7, the grooves 98 are formed in elongated inwardly directed bosses 100, which, together with a boss 102, serve to maintain the sub in definite position in the collar of the whipstock. Through the boss 102 passes the shear pin 104, which may be threaded into the retrieving sub. As illustrated in Figure 6, the boss 102 is preferably pointed at its upper and lower ends to deflect the bolts around it in a later phase of the operation.

The operation of this modification is essentially similar to that of the previous one, with the exception, as mentioned above, that a go-devil need not be lowered initially with the assembly, since the bolts 86 engage the grooves 98 due to screws 96. Due to this engagement of the bolts in the grooves, they take the rotary strains involved prior to and subsequent to the making of the orientation record as described above. After the orientation record has been studied, and the assembly brought to what is believed to be proper position, pressure may be applied to cause the whipstock to pierce the ground without shearing the shear pin 104. If, however, the shear pin is then sheared off, the elongated nature of the slots 92 will prevent the shearing off of the screws 96, so that the whipstock remains under the control of the drill stem. After a checking determination of the whipstock position is made, the drill stem may be further lowered, whereupon the screws 96 will be sheared, and the springs 90 will withdraw the bolts 86 from the grooves 98. Drilling may then be effected down the face of the whipstock.

When it is desired to withdraw the whipstock, it is then only necessary to drop a go-devil to force the levers 88 outwardly to bring the bolts into position to engage the bottom of the whipstock collar (desirably ultimately within notches 202) or an inwardly directed flange at the top of the whipstock collar of the type not illustrated in this modification, but similar to that illustrated at 32 in the first modification.

Figure 8:
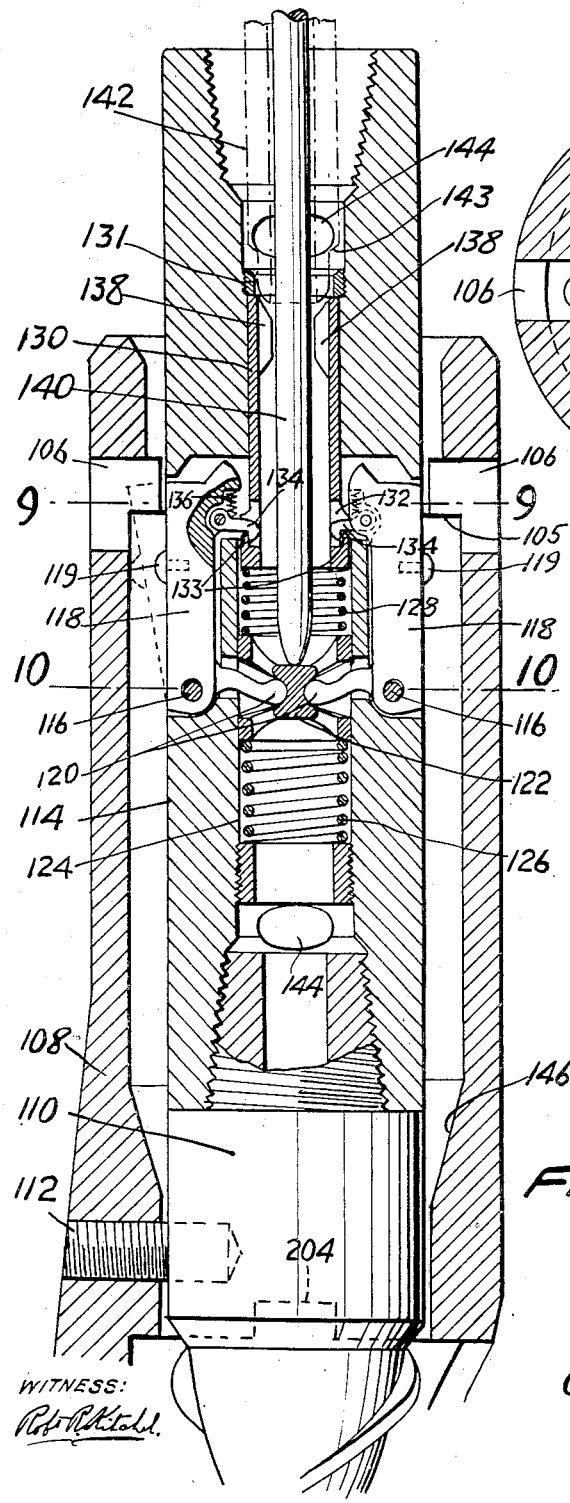
Figure 8 is a longitudinal section taken through still another modified form of the invention.
Figure 9:
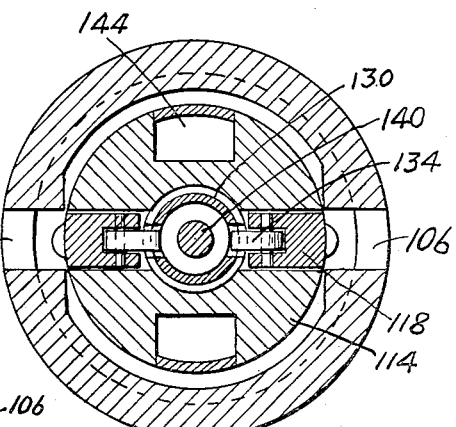
Figure 9 is a transverse section taken on the plane indicated at 9—9 in Figure 8.
Figure 10:
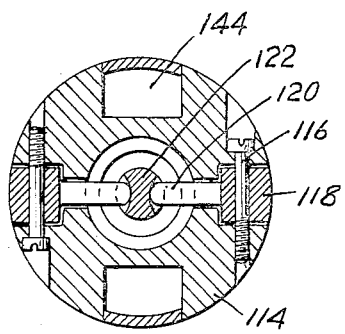
Figure 10 is a transverse section taken on the plane indicated at 10—10 in Figure 8.

In the third modification of Figures 8, 9 and 10, the same general manipulations may be effected, but in this case further control is provided as well as automatic engaging operations.

In this modification, a whipstock is provided as indicated at 108, connected by a shear pin 112 to the bit 110 or any other desired element of the assembly. The upper end of the whipstock collar is provided with a shoulder 105, in which are formed elongated slots 106 of the form illustrated and resembling to a substantial extent the elongated slots 28 of the first modification. The sub 114 supports loosely, through the medium of pivot pins 116, dogs 118 provided with rivets 119 having their rounded heads projecting outwardly from the dogs. These rivets are preferably made of soft metal, such as copper, and function as will be indicated hereafter. The lower ends of the dogs 118 are provided with inwardly extending arms 120, which engage sockets in a sliding spider 122 mounted in the bore 124 of the sub and urged upwardly by a strong spring 126. Above the spider is located a lighter spring 128, which serves to urge upwardly a sleeve 130 to an upper position limited by a ring 131 threaded into the bore of the sub. The sleeve 130 is provided with slots 132 providing lips 133 engageable by latches 134 pivoted to the dogs 118 and urged downwardly by springs 136.

At the upper end of the sleeve 130 are provided landing ribs 138, adapted to be engaged by a sleeve type go-devil, indicated at 142. These ribs, however, are adapted to pass a rod type go-devil, indicated at 140, arranged to engage the spider 122.

Mud passages 144 are provided in the sub to enable mud to bypass the assembly of elements just described.

In the operation of this modification, the assembly is lowered without any go-devils being present, so that, while the whipstock is supported by the shear pin 112, the dogs 118 are in their outer positions (as illustrated in dotted lines at the left hand side in Figure 8) within the openings 106. These dogs desirably fit the openings sufficiently closely to take the strains of rotation, as described in connection with the previous modifications. They project sufficiently inwardly into the shoulder 105 to insure that in the event of accidental shearing of the pin 112, they will prevent loss of the whipstock by engaging the upper ends of the slots 106. After orientation is effected in the fashion described above, the pin 112 is sheared by applying the weight of the drill stem and as the drill stem is then lowered, the rivets 119 will be cammed inwardly by the tapered portion 146 of the opening in the whipstock collar, thereby forcing the dogs 118 inwardly to permit their lips 134 to engage the lips 133 at the lower ends of the slots 132 of the sleeve 130. As drilling takes place, the dogs will then remain flush with or inside the periphery of the sub 114. During the drilling, the soft rivet heads 119 will probably be worn away, but this is of no consequence, since they will have performed the function of forcing their dogs inwardly to a flush position despite the fact that there is appreciable clearance between the lower portion of the collar of the whipstock and the sub 114.

If after completion of drilling it is desired to retrieve the whipstock immediately, the sleeve go-devil 142 may be dropped, with the result that it will move the sleeve 130 downwardly, compressing the light spring 128 and releasing the latches 134 to permit the dogs to be moved outwardly under the action of the strong spring 126. To prevent too much compression of the spring 128, the sleeve go-devil 142 is provided with a shoulder 143 to engage the stationary ring 131 and thereby limit its downward movement. After the dogs 118 are moved outwardly, an action which is desirably accomplished while they are below the whipstock collar, they will, on upward movement of the drill stem, engage the collar and are preferably turned into engagement within the notches 204. If they are moved outwardly while within the collar, they will engage the shoulder 105 or the upper ends of slots 106. Thus in either case, the whipstock may be lifted with the drill stem.

If it is not desired to effect retrieving immediately, it is only necessary to leave the dogs 118 in their inner positions whereupon, the bit can be withdrawn freely from the whipstock and the whipstock recovered on a subsequent trip.

The go-devil 140 is normally not needed, since, in general, the inner position of the dogs 118 will be effected through the cam action of the taper 146 on the rivets 119. However, if for any reason after these rivets are worn off it is desired to effect withdrawal of the dogs 118, it is only necessary to drop the go-devil 140, which, by engagement with the spider 122, will withdraw the dogs, since the weight of the go-devil 140 is sufficient to overcome the upward pressure of the spring 126.

It will be clear that numerous other modifications may be made embodying the principles of the invention.

What I claim and desire to protect by Letters Patent is:

1. In combination, a drill stem, a tool adapted to be oriented in a bore hole, means movable transversely of the drill stem to project therefrom, said tool having means engageable by said movable means without substantial circumferential play so that the tool is rotatable by the drill stem, and means for maintaining temporary engagement of the aforementioned means.

2. In combination, a drill stem, a tool adapted to be oriented in a bore hole, means movable transversely of the drill stem to project therefrom, said tool having means engageable by said movable means without substantial circumferential play so that the tool is rotatable by the drill stem, and means for maintaining temporary engagement of the aforementionel means, the last mentioned means comprising a removable go-devil.

3. In combination, a drill stem, a tool adapted to be oriented in a bore hole, means movable transversely of the drill stem to project therefrom, said tool having means engageable by said movable means without substantial circumferential play so that the tool is rotatable by the drill stem, and means for maintaining temporary engagement of the aforementioned means, the last mentioned means comprising a shearable element.

4. In combination, a drill stem, a tool adapted to be oriented in a bore hole, means movable transversely of the drill stem to project therefrom, said tool having means providing a longitudinal groove engageable by said movable means without substantial circumferential play so that the tool is rotatable by the drill stem, and means for maintaining temporary engagement of the aforementioned means.

5. In combination, a drill stem, a tool adapted to be oriented in a bore hole, means movable transversely of the drill stem to project therefrom, said tool having means providing a longitudinal groove engageable by said movable means without substantial circumferential play so that the tool is rotatable by the drill stem, and means for maintaining temporary engagement of the aforementioned means, the last mentioned means comprising a removable go-devil.

6. In combination, a drill stem, a tool adapted to be oriented in a bore hole, means movable transversely of the drill stem to project therefrom, said tool having means providing a longitudinal groove engageable by said movable means without substantial circumferential play so that the tool is rotatable by the drill stem, and means for maintaining temporary engagement of the aforementioned means, the last mentioned means comprising a shearable element.

7. In combination, a drill stem, a tool adapted to be oriented in a bore hole, means movable transversely of the drill stem to project therefrom, said tool having means engageable by said movable means without substantial circumferential play so that the tool is rotatable by the drill stem, and means for maintaining temporary engagement of the aforementioned means, and additional shearable means for securing said drill stem and tool together.

8. In combination, a drill stem, a tool adapted to be oriented in a bore hole, means movable transversely of the drill stem to project therefrom, said tool having means providing a longitudinal groove engageable by said movable means without substantial circumferential play so that the tool is rotatable by the drill stem, and means for maintaining temporary engagement of the aforementioned means, and additional shearable means for securing said drill stem and tool together.

9. In combination, a drill stem, a tool adapted to be oriented in a bore hole, means movable transversely of the drill stem to project therefrom, said tool having means engageable by said movable means without substantial circumferential play so that the tool is rotatable by the drill stem, and spring means for maintaining temporary engagement of the aforementioned means.

10. In combination, a drill stem, a tool adapted to be oriented in a bore hole, means movable transversely of the drill stem to project therefrom, said tool having means engageable by said movable means without substantial circumferential play so that the tool is rotatable by the drill stem, spring means for maintaining temporary engagement of the aforementioned means, and latch means for maintaining said movable means out of engagement with the engageable means against the action of the spring means.

11. In combination, a drill stem, a tool adapted to be oriented in a bore hole, means movable transversely of the drill stem to project therefrom, said tool having means engageable by said movable means without substantial circumferential play so that the tool is rotatable by the drill stem, and means for maintaining temporary engagement of the aforementioned means, said movable means and the tool having engageable portions effecting by camming action movement of the movable means out of position to engage said engageable means.

12. In combination, a drill stem, a tool adapted to be oriented in a bore hole, means movable transversely of the drill stem to project therefrom, said tool having means engageable by said movable means without substantial circumferential play so that the tool is rotatable by the drill stem, means for maintaining temporary engagement of the aforementioned means, and an element engageable by a go-devil to effect movement of the movable means out of position to engage said engageable means.

13. In combination, a drill stem, a tool adapted to be oriented in a bore hole, means movable transversely of the drill stem to project therefrom, said tool having means engageable by said movable means without substantial circumferential play so that the tool is rotatable by the drill stem, spring means for maintaining temporary engagement of the aforementioned means, and latch means for maintaining said movable means out of engagement with the engageable means against the action of the spring means, the latch means being arranged for release by engagement by a go-devil.

14. The method of orienting a tool in a bore hole comprising lowering said tool in the bore hole on a hollow drill stem to which the tool is secured by means of a shear pin and additionally engaged by temporary means, lowering within the drill stem to a position adjacent the tool a well surveying instrument comprising elements for recording the azimuthal position of the tool and comprising also means for disengaging said temporary engaging means, causing said elements to record the tool position, causing said disengaging means to effect disengagement of the tool by said temporary engaging means, withdrawing the well surveying instrument, and fixing said tool in the hole by shearing the pin.

GOTTDANK L. KOTHNY.